Figure 1:
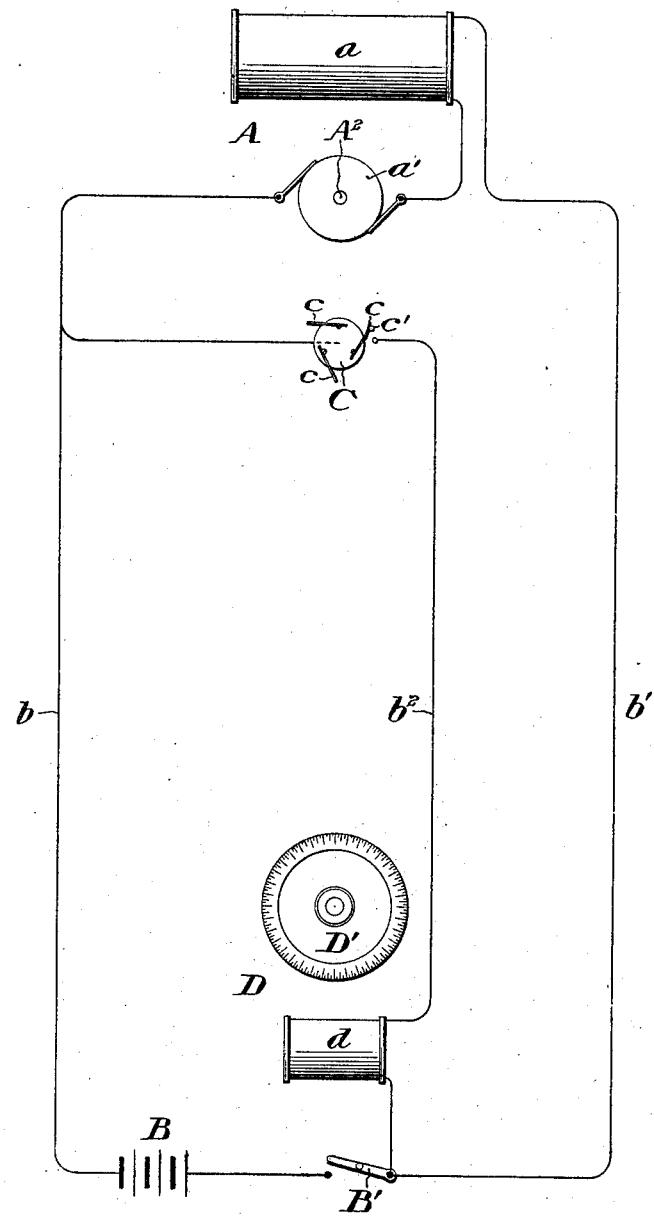

No. 688,119. Patented Dec. 3, 1901.
W. REES.
ELECTRICALLY CONTROLLED MECHANISM FOR TIME LOCKS.
(Application filed Aug. 16, 1901.)
(No Model.) 5 Sheets—Sheet 1.

WITNESSES:
Clifton C. Hallowell
Edward Rittenhouse

INVENTOR:
WALTER REES,
by Arthur E. Paige
Atty.

No. 688,119. Patented Dec. 3, 1901.
W. REES.
ELECTRICALLY CONTROLLED MECHANISM FOR TIME LOCKS.
(Application filed Aug. 16, 1901.)
(No Model.) 5 Sheets—Sheet 2.

WITNESSES:
Clifton C. Hallowell
Edward Rittenhouse

INVENTOR:
WALTER REES,
by Arthur E. Paige
Atty.

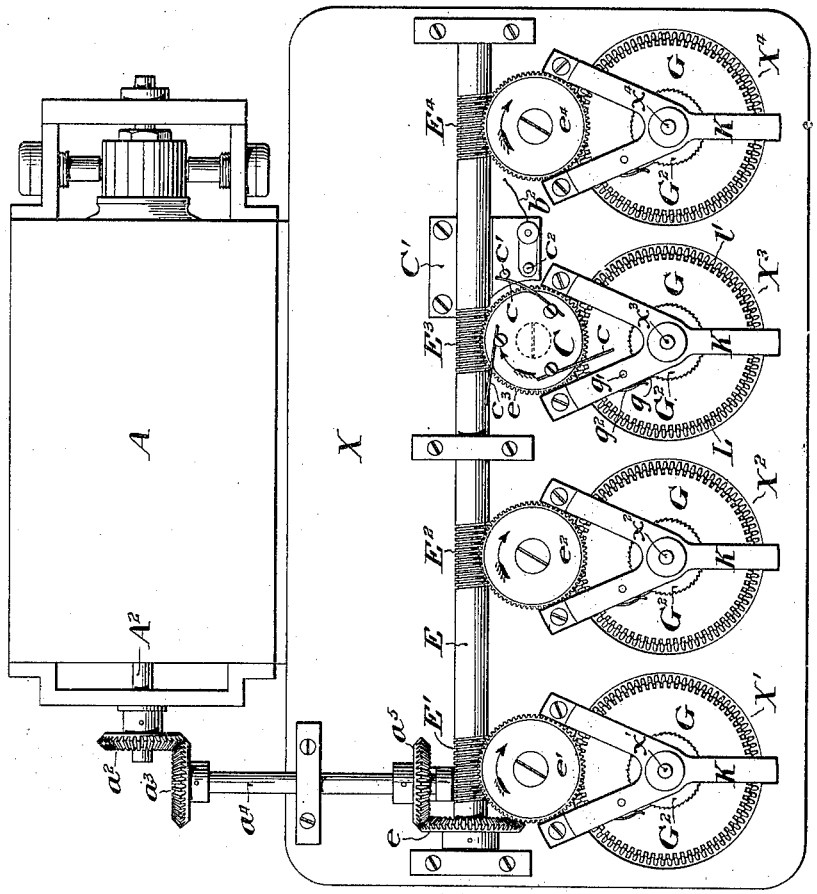

No. 688,119. Patented Dec. 3, 1901.
W. REES.
ELECTRICALLY CONTROLLED MECHANISM FOR TIME LOCKS.
(Application filed Aug. 16, 1901.)
(No Model.) 5 Sheets—Sheet 4.
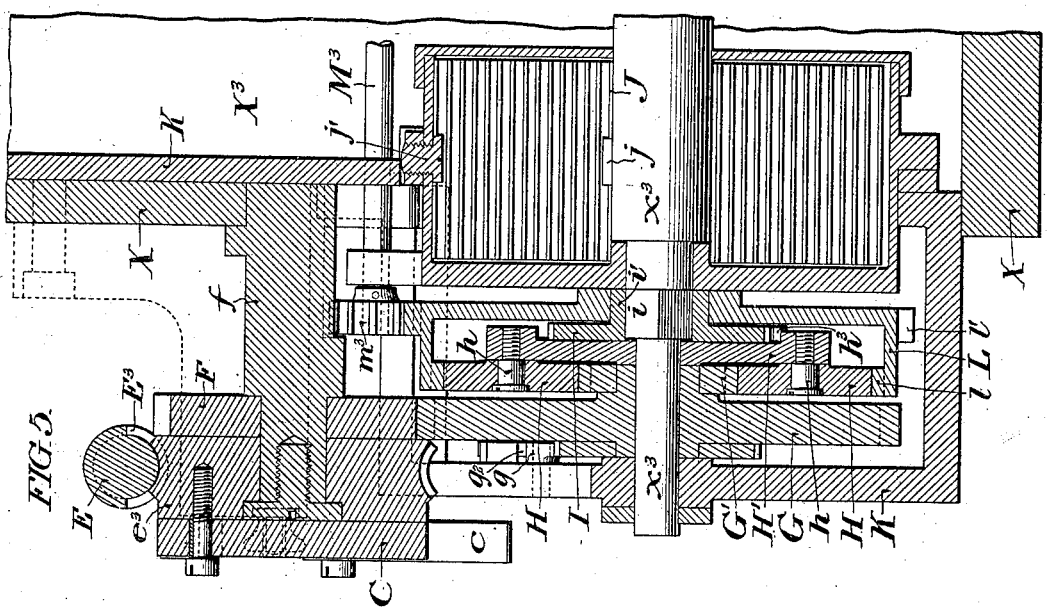
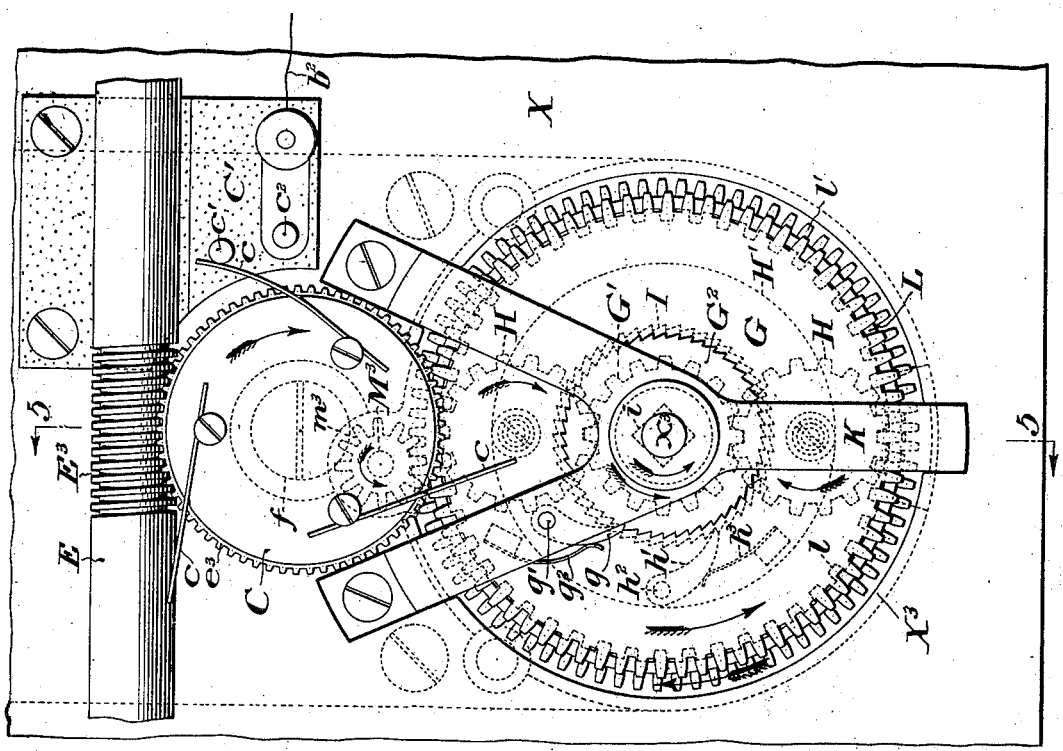
WITNESSES:
Clifton C. Hallowell
Edward Rittenhouse
INVENTOR:
WALTER REES, No. 688,119. Patented Dec. 3, 1901.
W. REES.
ELECTRICALLY CONTROLLED MECHANISM FOR TIME LOCKS.
(Application filed Aug. 16, 1901.)
(No Model.) 5 Sheets—Sheet 5.
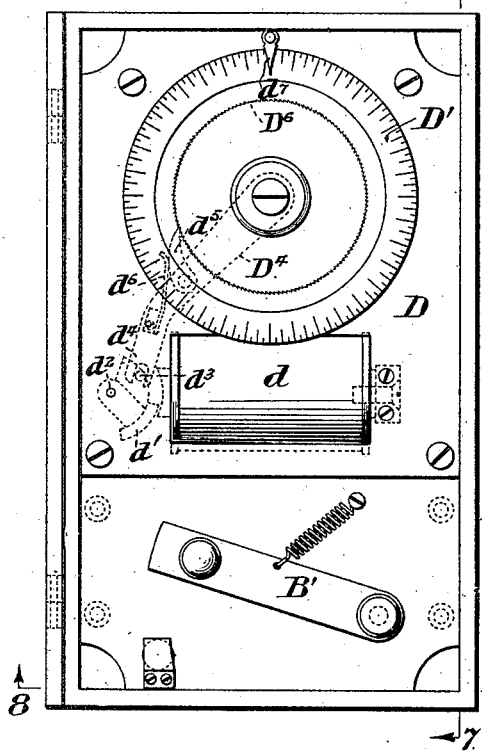
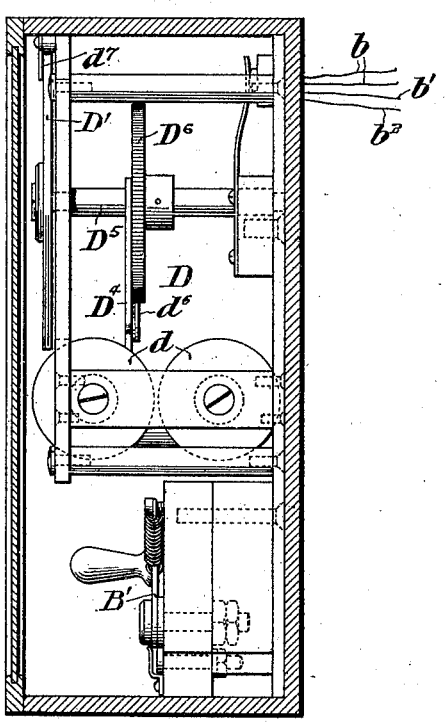
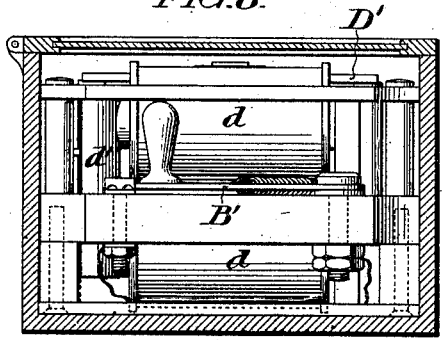
WITNESSES:
Clifton C. Hallowell
Edward Rittenhouse
INVENTOR:
WALTER REES,
By Arthur E. Paige
Atty

UNITED STATES PATENT OFFICE.

WALTER REES, OF PHILADELPHIA, PENNSYLVANIA, ASSIGNOR TO WILLIAM H. HOLLAR, OF PHILADELPHIA, PENNSYLVANIA.

ELECTRICALLY-CONTROLLED MECHANISM FOR TIME-LOCKS.

SPECIFICATION forming part of Letters Patent No. 688,119, dated December 3, 1901.

Application filed August 16, 1901. Serial No. 72,265. (No model.)

*To all whom it may concern:*

Be it known that I, WALTER REES, of Philadelphia, in the State of Pennsylvania, have invented a certain new and useful Electrically-Controlled Winding Mechanism for Time-Locks, whereof the following is a specification, reference being had to the accompanying drawings.

My invention relates to devices comprising a motor designed to automatically wind the clock-movements of a time-lock within a safe or vault at the will of the operator and without the manual labor of the latter.

It is characteristic of the prior devices of the class specified that the winding-motor is normally disconnected from the clock-movements and arranged to be connected therewith only during the winding action of the device, such disconnected relation of the motor and clock-movements being necessary during the normal operation of the clock-movements to permit the main arbors of the latter to be rotated by their respective springs in a direction opposite to that in which they are rotated when wound by the motor.

It is characteristic of my present invention that the winding-motor is at all times in operative connection with the clock-movements, the connection between the motor and clock-movements being such that the springs of the respective clock-movements may be wound in one direction by said motor and may freely unwind in the other direction, the connecting media being arranged, as hereinafter described, so that there is no reverse motion of the winding-motor occasioned by the reverse motion of the clock-movements.

Generally stated, the main features of my invention comprise the combination, with a safe or vault, of a time-lock therefor having one or more clock-movements, any one of which is designed to effect or permit of the release of the lock after a predetermined interval, of a motor, winding mechanism permanently connecting said motor with one or more of said clock-movements, and electric circuits, &c., arranged to wind said clock movement or movements at the will of the operator. Said electric circuits include a controlling-switch, which may be conveniently located within the time-lock inclosure. However, I prefer to extend the electric circuits and provide a controlling-switch exterior to and distant from the time-locked inclosure to enable a distant operator to rewind the clock-movements in any emergency in which it is desired to postpone the moment of opening of said inclosure originally predetermined by the set of the time-lock mechanism when said inclosure was locked.

My invention also comprehends various details of construction and arrangement and adjuncts to the main elements above recited, hereinafter specified and claimed. For instance, I find it convenient to employ an indicator for manifesting to the distant operator the extent to which the winding-motor has actuated the clock-movements.

My present improvements are applicable to any ordinary form of time-lock, and I have shown in the accompanying drawings a time-lock provided with the ordinary manually-operative winding mechanism in association with my improvements. However, it is to be understood that all of the winding or rewinding operations of a time-lock may be effected by my device to the exclusion of said ordinary manually-operative mechanism.

Figure 2:
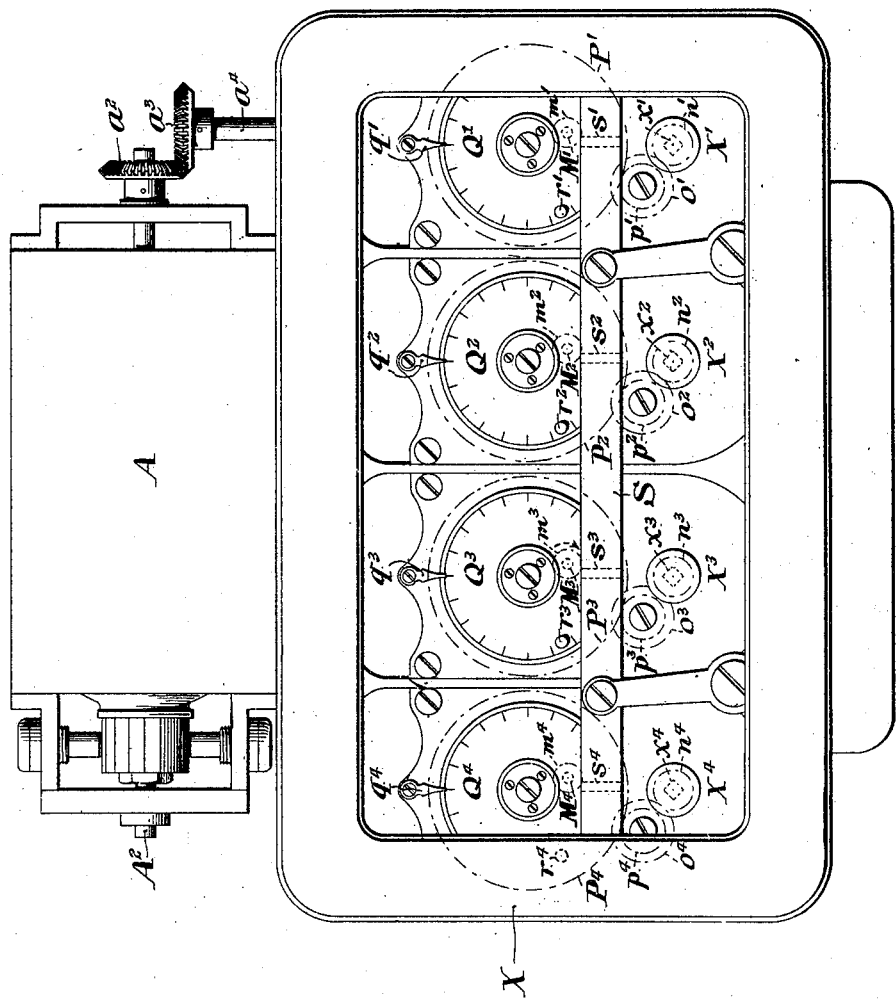

In the accompanying drawings, Figure 1 represents diagrammatically a convenient arrangement of electrical connections for my invention. Fig. 2 is a front elevation of a time-lock conveniently embodying my improvements. Fig. 3 is a rear elevation of the casing for the clock-movements comprised in the time-lock shown in Fig. 2. Fig. 4 shows a fragment of Fig. 3 on an enlarged scale. Fig. 5 is a sectional view taken on the line 5 5 in Fig. 4. Fig. 6 is a front elevation of the indicator. Fig. 7 is a sectional view of the indicator, taken on the line 7 7 in Fig. 6. Fig. 8 is a sectional view of the indicator, taken on the line 8 8 in Fig. 6.

Referring to Fig. 1, A is an electric motor, comprising the field-coil $a$ and the armature $a'$, which, as hereinafter described, is arranged to actuate the winding mechanism of the time-lock. The electric generator B (indicated as a primary battery) is in circuit with said motor through the conductors $b\ b'$, and B' is a switch by which the operation of said motor is controlled. The shunt-conductor $b^2$, extending parallel with the conductor $b'$, includes the rotary indicator-switch C and the field-coil $d$ of the indicator-motor D, which actuates the indicator-dial D', as hereinafter described.

Referring to Figs. 2 and 3, A is the motor, which, as indicated diagrammatically in Fig. 1, is in circuit with a suitable generator and provided with the necessary appurtenances, such as the controlling-switch B'. The motor A is conveniently fixed upon the casing X of the time-lock, which latter comprises four clock-movements, respectively indicated at $X' X^2 X^3 X^4$. Said motor A is provided with an armature-shaft $A^2$, upon which is fixed the bevel-gear $a^2$, in engagement with the corresponding bevel-gear $a^3$ upon the counter-shaft $a^4$, which is provided at its lower extremity with the bevel-gear $a^5$, in engagement with the bevel-gear $e$, fixed upon the worm-shaft E. Said shaft E is mounted for rotation in suitable bearings upon said casing X and is provided with worms $E' E^2 E^3 E^4$, which respectively actuate independent groups or trains of gearing members which respectively connect said worms and clock-movements. As said groups are counterpart, I shall confine the detailed illustration and description thereof to the particular group operatively connecting the worm $E^3$ with the movement $X^3$, as follows:

Referring to Figs. 4 and 5, the worm-gear $e^3$ carries the gear F, and both are conveniently mounted for rotation upon the stud $f$, fixed to the casing X. Said gear F is in toothed engagement with the gear G, which carries the sun-gear G' and is loosely mounted for rotation upon the main arbor $x^3$ of the clock-movement $X^3$. The sun-gear G' is in toothed engagement with the counterpart planetary gears H, which latter are mounted for rotation upon the studs $h$, which are fixed in the planetary-gear frame H'. Said gear-frame carries the pawl $h'$, which is pivoted thereon at $h^2$ and provided with the spring $h^3$, by which it is maintained in operative relation with the ratchet I. Said ratchet I is fixed upon the main arbor $x^3$ of the clock-movement conveniently by engagement with the squared portion $i$ thereof, and said arbor is operatively engaged at $j$ with the inner extremity of the clock-spring J, whose outer extremity is fixed at $j'$ upon the clock-frame K. Said planetary gears H are in toothed engagement with the internal gear $l$ upon the drum L, which latter is loosely mounted for rotation upon the hub $i'$ of the ratchet I. Said drum L is provided with an external gear $l'$, which latter engages the pinion $m^3$ upon the shaft $M^3$, which is the prime member of the escapement-train of the clock-movement $X^3$. It is to be understood that said train may be of any ordinary construction or arrangement adapted to govern the speed of unwinding the arbor $x^3$.

The keeper-pawl $g$, which is pivoted at $g'$ upon the clock-frame K, is provided with the spring $g^2$, which maintains said pawl in such engagement with the ratchet $G^2$, fixed upon the gear G, as to prevent reverse rotation of the connected gears G G', &c. Said pawl-and-ratchet connection renders it impossible for the operator to run down the movements by reversal of the motor and also serves to prevent the release of the spring J when the clock-movement is removed from the casing X for repairs, &c.

The operation of the parts above described is as follows: The switch B' being closed, the motor A is energized by the current from the generator B. The armature-shaft $A^2$, counter-shaft $a^4$, and worm-shaft E are rotated, and each of the worm-gears $e' e^2 e^3 e^4$ is thereby rotated in the direction of the arrows marked upon them to actuate the respective train of winding mechanism leading to the clock-movements $X' X^2 X^3 X^4$. Referring particularly to Figs. 4 and 5 and the train of mechanism therein shown in detail, the gear F, which is carried by the worm-gear $e^3$, rotates the gear G in the direction of the arrow marked upon it, together with the sun-gear G', and the planetary gears H are thereby rotated in the direction of the arrows marked upon them. Said planetary gears being engaged with the gear $l$ of the drum L, the gear-frame H', upon which said planetary gears are mounted, is rotated in the direction of rotation of the gears G G'. The drum L being relatively stationary, said gear-frame H' by the pawl $h'$, which is pivoted thereon, rotates the ratchet I and arbor $x^3$ in the direction of the arrow marked thereon in Fig. 4, and the spring J is thereby wound within its casing.

It is to be noted that the automatic winding operation of my invention does not interfere with the normal operation of the clock-movement which is being wound, as the arbor $x^3$ of said movement continues to rotate under pressure of the spring J in the direction opposite to that indicated by the arrow in Fig. 4. Said reverse movement of the arbor $x^3$ rotates the gear-frame H' in the reverse direction by means of the pawl $h'$, connecting the ratchet I and said frame; but the gears G G' being prevented from reverse rotation by the engagement of their ratchet $G^2$ with the keeper-pawl $g$ the planetary gears H are caused to rotate upon their individual axes in the direction of the arrows marked upon them by their engagement with the detained sun-gear G'. The aforesaid unwinding rotation of said planetary gears H tends to rotate the drum L in the same direction as the unwinding rotation of the spindle $x^3$, and the pinion $m^3$ upon the shaft $M^3$ of the escapement-train is thereby rotated in the direction of the arrow marked upon it in Fig. 4.

It is to be understood that the effect of the rotary motion transmitted, as above described, from the unwinding spring-arbors $x' x^2 x^3 x^4$ to the respective escapement-trains connected therewith is to regulate the speed of rotation of said arbors during their unwinding movement. As indicated in Fig. 2, the front extremities of said spring-arbors $x'$ $x^2$ $x^3$ $x^4$ are respectively provided with gears $n'$ $n^2$ $n^3$ $n^4$, engaged with the idle gears $o'$ $o^2$ $o^3$ $o^4$, coupled to the idle gears $p'$ $p^2$ $p^3$ $p^4$, which latter rotate the gears $P'$ $P^2$ $P^3$ $P^4$, carrying the graduated indicator-dials $Q'$ $Q^2$ $Q^3$ $Q^4$, the graduations upon said dials being numbered. Said dials coöperate with the stationary indexes $q'$ $q^2$ $q^3$ $q^4$ to indicate the number of hours during which the respective movements will continue to unwind before the eccentric-studs $r'$ $r^2$ $r^3$ $r^4$, carried by said dials, will encounter the respective lugs $s'$ $s^2$ $s^3$ $s^4$ upon the tripping-bar S. It is to be understood that the encounter of any one of said studs $r'$, &c., with its respective lug upon said tripping-bar suffices to shift the latter to release or open the lock in the manner well known in this art.

It is to be noted that the front extremities of the spring-arbors $x'$, &c., being squared, as indicated in Fig. 2, to receive a key said arbors may be manually rotated and the respective springs of the clock-movements be independently wound, the only effect of such manual operation being that the ratchets I, fixed upon the respective spring-arbors, are idly rotated beneath the pawls $h'$, by which they are connected with the gear-frames H', and without rotating the latter.

In order that the distant operator controlling the motor A may be informed as to the precise extent of the winding movement effected thereby, I find it convenient to mechanically connect an electrical switch with the winding mechanism and arrange said switch to automatically operate an electrical indicator at the distant station, the parts being arranged as follows: The rotary electric switch C, comprising the three spring-arms $c$, is fixed upon the worm-gear $e^3$ in shunt-circuit with the armature $a'$ of the winding-motor A, said circuit being conveniently established through the casing X and the stud $f$, upon which said switch is arranged to rotate, as above described. Said arms $c$ successively contact with the stud $c'$, which is insulated in the base-block C', and said arms, being retracted by their rotary encounter with the insulated stud $c'$, snap into electrical contact with the stud $c^2$, with which the conductor $b^2$ is in electrical connection, and are retracted by their rotary encounter with the stud $c^2$ and snap away from the latter to avoid sparking. As indicated in Fig. 1, said conductor $b^2$ is parallel with the conductor $b'$, extending from the winding-motor, and said conductor $b^2$ conveys the current through the field-coil $d$ of the indicator-motor D to operate the latter each time one of the contact-springs $c$ encounters the stud $c^2$.

As shown in Figs. 6, 7, and 8, the indicator-motor D comprises the armature $d'$, which is opposed to the field $d$ of said indicator-motor and mounted to oscillate upon the shaft $d^2$. Said armature $d'$ carries the eccentric-pin $d^3$, engaged with the bifurcated end $d^4$ of the lever D⁴. Said lever D⁴ is loosely mounted upon the shaft $D^5$ and carries the pawl $d^5$, whose spring $d^6$ maintains said pawl in engagement with the ratchet-wheel $D^6$, fixed to said shaft $D^5$. The indicator-dial D' is also fixed to said shaft $D^5$, so that each time the motor-field $d$ is energized by the operation of the switch C said dial is rotated the extent of one graduation with respect to the stationary index $d^7$. Said dial D' is graduated in correspondence with the dial $Q^3$, which, through the gearing hereinbefore described, is rotated in definite relation with the spring-arbor $x^3$, and the arrangement of the mechanism of the indicator-motor D is such that the indicator-dial D' is shifted in correspondence with the movement of said arbor $x^3$ and presents to the distant operator controlling the switch B' such manifestation of the position of the time-lock clock-movement as is presented by the dial $Q^3$ immediately connected with said movement.

Although I find it convenient to mount the controlling-switch B' within the casing inclosing the indicator D, as shown in Figs. 6, 7, and 8, it is obvious that the parts need not be so related.

In order to prevent overwinding the clock-movements $X'$ $X^2$ $X^3$ $X^4$, I find it convenient to provide said movements with the ordinary Geneva stop mechanism to effect that result mechanically or with similar mechanism arranged to break the electric circuit of the motor A at the instant when the winding action should be terminated.

Although I prefer to employ an electric motor to actuate the winding mechanism, as above described, it is to be understood that I do not desire to limit myself to the use of such a motor in combination therewith, as it is obvious that the precise nature of the motor is not of the essence of my invention. Moreover, I do not desire to limit myself to the details of construction above described, as it is obvious that various modifications may be made therein without departing from the spirit of my invention.

I claim—

1. In a time-lock, the combination with a clock-movement; of a motor adapted to wind the spring of said movement; a train of gearing permanently connecting said motor and said spring in operative relation; and means, arranged to initiate the operation of said motor, substantially as set forth.

2. In a time-lock, the combination with a clock-movement; of a motor adapted to wind the spring of said movement; a train of gearing comprising a planetary gear permanently connecting said motor and said spring; and means, arranged to initiate the movement of said motor, substantially as set forth.

3. In a time-lock, the combination with a clock-movement comprising a spring and an arbor for said spring; of a motor adapted to wind said spring; and a train of gearing permanently connecting said motor and said spring-arbor, arranged to permit the unwinding movement of said arbor, without corresponding movement of said motor, substantially as set forth.

4. In a time-lock, the combination with a clock-movement; of a motor adapted to wind the spring of said movement; a shaft operatively related to said motor and provided with a worm; a sun-gear operatively connected with said worm and loosely mounted in concentric relation with the arbor of said spring; a planetary-gear frame loosely mounted in concentric relation with said arbor; a planetary gear connecting said sun-gear with said frame; and a ratchet operatively connecting said planetary-gear frame with said arbor, substantially as set forth.

5. In a time-lock, the combination with a clock-movement; of a motor adapted to wind the spring of said movement; a shaft operatively related to said motor and provided with a worm; a sun-gear operatively connected with said worm and loosely mounted in concentric relation with the arbor of said spring; a planetary-gear frame loosely mounted in concentric relation with said arbor; a planetary gear connecting said sun-gear with said frame; a ratchet operatively connecting said planetary-gear frame with said arbor; a drum loosely mounted for rotation in concentric relation with said arbor in operative relation with said planetary gear; and an escapement-train operatively connected with said drum, substantially as set forth.

6. In a time-lock, the combination with a clock-movement; of a motor free to wind the spring of said movement; a gearing-train permanently connecting said motor and said clock-movement, arranged to wind said spring by said motor and arranged to permit said spring to unwind without reverse movement of said motor, substantially as set forth.

7. In a time-lock, the combination with a clock-movement comprising a spring and an arbor for said spring; of a motor free to wind said spring; a train of gearing permanently connecting said motor and said spring-arbor, arranged to permit the unwinding movement of said arbor, without corresponding movement of said motor; an electric switch mechanically connected with said arbor; and an indicator electrically connected with said switch, substantially as set forth.

8. In a time-lock, the combination with a clock-movement comprising a spring and an arbor for said spring; of a motor free to wind said spring; a train of gearing permanently connecting said motor and said spring-arbor, arranged to permit the unwinding movement of said arbor without corresponding movement of said motor; an indicator mechanically connected with said arbor; an electric switch mechanically connected with said arbor; and an indicator electrically connected with said switch, substantially as set forth.

9. In a time-lock, the combination with a clock-movement; of a motor adapted to wind the spring of said movement; a shaft operatively related to said motor and provided with a worm; a worm-gear engaged with said worm and mounted for rotation in eccentric relation with the arbor of said spring; a sun-gear operatively connected with said worm-gear; a planetary gear operatively connected with said sun-gear and with the arbor of said spring; an electric switch in operative connection with said worm-gear; and an indicator electrically connected with said switch, substantially as set forth.

10. In a time-lock, the combination with a clock-movement; of a motor adapted to wind the spring of said movement; a shaft operatively related to said motor and provided with a worm; a worm-gear engaged with said worm and mounted for rotation in eccentric relation with the arbor of said spring; a sun-gear operatively connected with said worm-gear and loosely mounted in concentric relation with said arbor; a planetary-gear frame loosely mounted in concentric relation with said arbor; a planetary gear mounted for rotation upon said frame; a ratchet fixed upon said arbor; a pawl upon said gear-frame operatively engaged with said ratchet; a drum loosely mounted for rotation in concentric relation with said arbor, comprising a gear engaged by said planetary gear; an escapement-train operatively connected with said drum; an electric switch mechanically connected with said arbor; and an indicator electrically connected with said switch, substantially as set forth.

In testimony whereof I have hereunto signed my name at Philadelphia, Pennsylvania, this 12th day of August, 1901.

WALTER REES.

Witnesses:
ARTHUR E. PAIGE,
WM. C. WEISBROD.